United States Patent [19]
Watari et al.

[11] Patent Number: 5,807,044
[45] Date of Patent: Sep. 15, 1998

[54] MACHINE TOOL WITH PIVOTING SPINDLE UNIT

[75] Inventors: Jun Watari; Takashi Yoshida; Tetsuharu Komatsu; Dai Arai; Tomomi Kousaka; Kazuhide Ito, all of Sayama, Japan

[73] Assignee: Honda Giken Kogyo Kabushiki Kaisha, Tokyo, Japan

[21] Appl. No.: 763,783

[22] Filed: Dec. 11, 1996

[30] Foreign Application Priority Data

Dec. 18, 1995 [JP] Japan ................................. 7-328781

[51] Int. Cl.⁶ ..................................................... B23C 1/00
[52] U.S. Cl. ......................... 409/183; 408/236; 409/191; 409/201; 409/204; 409/211; 409/216; 409/235
[58] Field of Search ..................... 409/183, 185, 409/190, 191, 201, 204, 206, 211, 231, 235, 236, 199, 216; 408/234, 236

[56] References Cited

U.S. PATENT DOCUMENTS

| | | | |
|---|---|---|---|
| 3,000,270 | 9/1961 | Gunderson | 409/183 |
| 3,806,691 | 4/1974 | Roach | 409/185 |
| 3,864,816 | 2/1975 | Brusch | 409/183 |
| 4,002,102 | 1/1977 | Brown | 409/183 |
| 4,417,843 | 11/1983 | Bonga | 414/676 |
| 4,512,695 | 4/1985 | Brun et al. | 409/201 |
| 4,776,749 | 10/1988 | Wanzenberg et al. | 408/236 |
| 4,787,138 | 11/1988 | Eaton et al. | 29/748 |
| 5,267,818 | 12/1993 | Marantette | 409/235 |
| 5,388,935 | 2/1995 | Sheldon | 409/201 |
| 5,401,128 | 3/1995 | Lindem et al. | 409/235 |
| 5,569,004 | 10/1996 | Marantette | 409/235 |

FOREIGN PATENT DOCUMENTS

3710688  10/1988  Germany ................ 409/183

Primary Examiner—A. L. Pitts
Assistant Examiner—Christopher Kirkman
Attorney, Agent, or Firm—Birch, Stewart, Kolasch & Birch, LLP

[57] ABSTRACT

Ball screws are moved axially to move a spindle unit in directions X, Y to position a cutter mounted on the spindle unit. Support arm assemblies which support the spindle unit are also moved. Then, a slide table which supports the support arm assemblies is moved in a direction Z to cause the cutter to machine a workpiece.

5 Claims, 10 Drawing Sheets

FIG. 9

MACHINE TOOL WITH PIVOTING SPINDLE UNIT

BACKGROUND OF THE INVENTION

1. Field of the Invention

The present invention relates to a machine tool for machining a workpiece with a cutter mounted on a spindle which can be universally moved to position the cutter with respect to the workpiece.

2. Description of the Related Art

There have heretofore been used numerically controlled machine tools in which a spindle unit holding a cutter is moved to a predetermined position with respect to a workpiece and then the cutter is operated to machine the workpiece as desired. The numerically controlled machine tools usually have a plurality of slide tables on which the spindle unit is supported. The slide tables are moved along three axes that extend perpendicularly to each other for moving the spindle unit to position the cutter in the predetermined position with respect to the workpiece.

Since the slide tables are considerably heavy, they impose a large load on actuators for moving the spindle unit to the predetermined position, and various techniques need to be used to keep a desired level of accuracy with which to position the cutter with respect to the workpiece. The heavy slide tables may possibly make it difficult to suppress vibrations of the numerically controlled machine tools. Another problem is that the numerically controlled machine tools themselves tend to be large in size.

SUMMARY OF THE INVENTION

It is a general object of the present invention to provide a machine tool having a relatively light mechanism for moving a spindle unit to position a cutter held by the spindle unit easily, quickly, and highly accurately.

A major object of the present invention is to provide a machine tool which is free of slide tables and hence relatively light, preventing itself from suffering undue vibrations for thereby allowing a cutter to be positioned stably with high precision.

The above and other objects, features, and advantages of the present invention will become apparent from the following description when taken in conjunction with the accompanying drawings in which preferred embodiments of the present invention are shown by way of example.

DETAILED DESCRIPTION OF THE PREFERRED EMBODIMENTS

FIGS. 1 through 4 show a machine tool 10 according to a first embodiment of the present invention. As shown in FIGS. 1 through 4, the machine tool 10 comprises a support base 12, a slide table 14 supported on the support base 12 for movement in the direction indicated by the arrow Z toward a workpiece W (see FIG. 4) to be machined by the machine tool 10, a spindle unit 16 which holds a cutter T for cutting the workpiece W, a pair of support arm assemblies 18, 20 having respective ends pivotally supported on the slide table 14 and respective other ends supporting the spindle unit 16 for movement in the directions indicated by the arrows X, Y, and a pair of displacing means 22, 24 pivotally supported on respective opposite lateral sides of the slide table 14 and coupled to the spindle unit 16 for displacing the spindle unit 16 in the directions indicated by the arrows X, Y.

The base 12 has a pair of laterally spaced guide rails 26a, 26b mounted on an upper surface thereof and extending in the direction indicated by the arrow Z. Rail holders 28a, 28b mounted on a lower surface of the slide table 14 are slidably supported on the respective rails 26a, 26b for sliding movement along the rails 26a, 26b. A motor 30 for moving the slide table 14 is fixed to the base 12. The motor 30 has a rotatable shaft coupled coaxially to a ball screw 32 which is disposed between and extends along the guide rails 26, 26b. The ball screw 32 is rotatably supported on the base 12 and threaded through a nut 34 which is fixed to the lower surface of the slide table 14.

The spindle unit 16 has a built-in motor 36 for rotating the cutter T about its own axis.

The support arm assemblies 18, 20 comprise a pair of respective first arms 42, 44 having respective ends pivotally supported on respective bearings 38, 40 fixed to the slide table 14 and a pair of respective second arms 50, 52 having respective ends pivotally supported on respective bearings 46, 48 fixed to the respective other ends of the first arms 42, 44. The spindle unit 16 is coupled to the respective other ends of the second arms 50, 52. The second arms 50, 52 have their respective intermediate portions bent away from the first arms 42, 44 to avoid physical interference with the first arms 42, 44 when the second arms 50, 52 are angularly moved about the respective bearings 46, 48.

Figure 1:
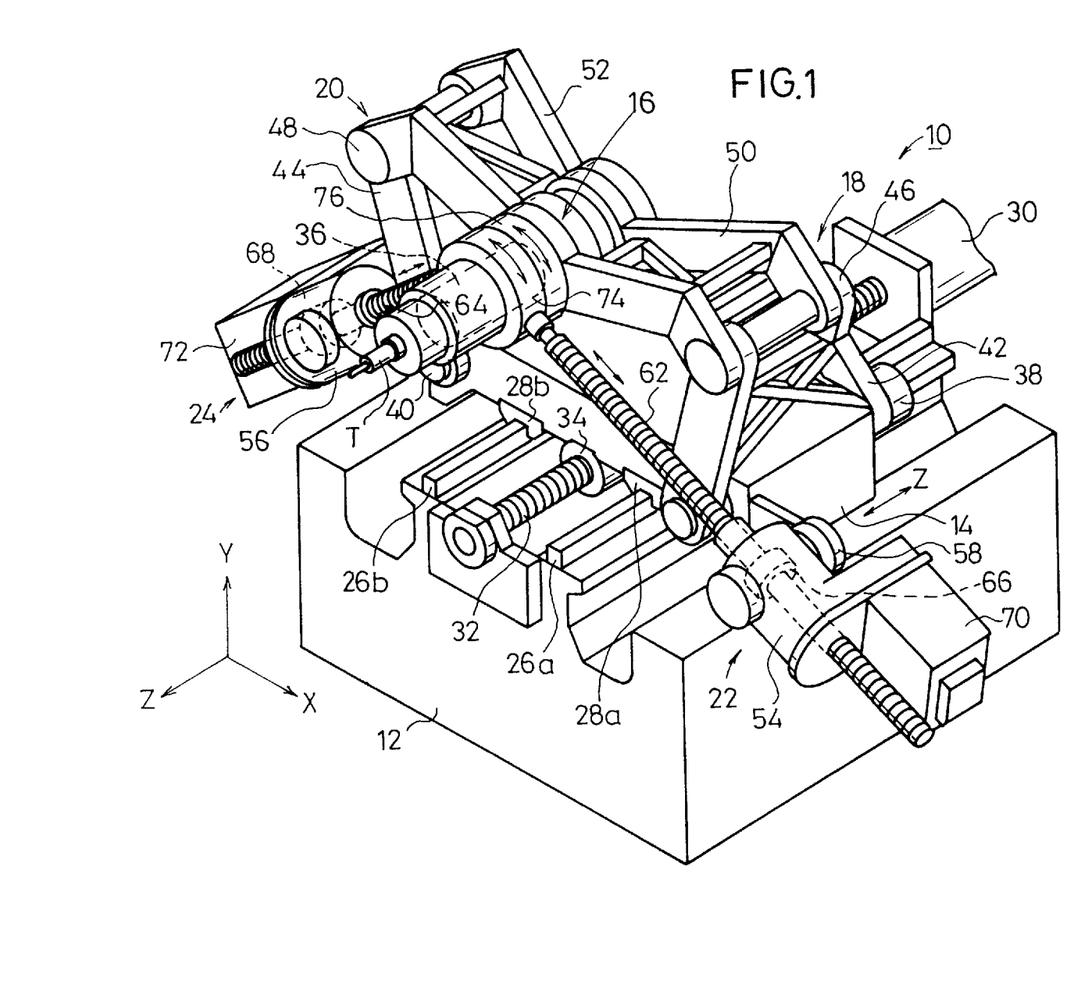
FIG. 1 is a perspective view of a machine tool according to a first embodiment of the present invention.
Figure 2:
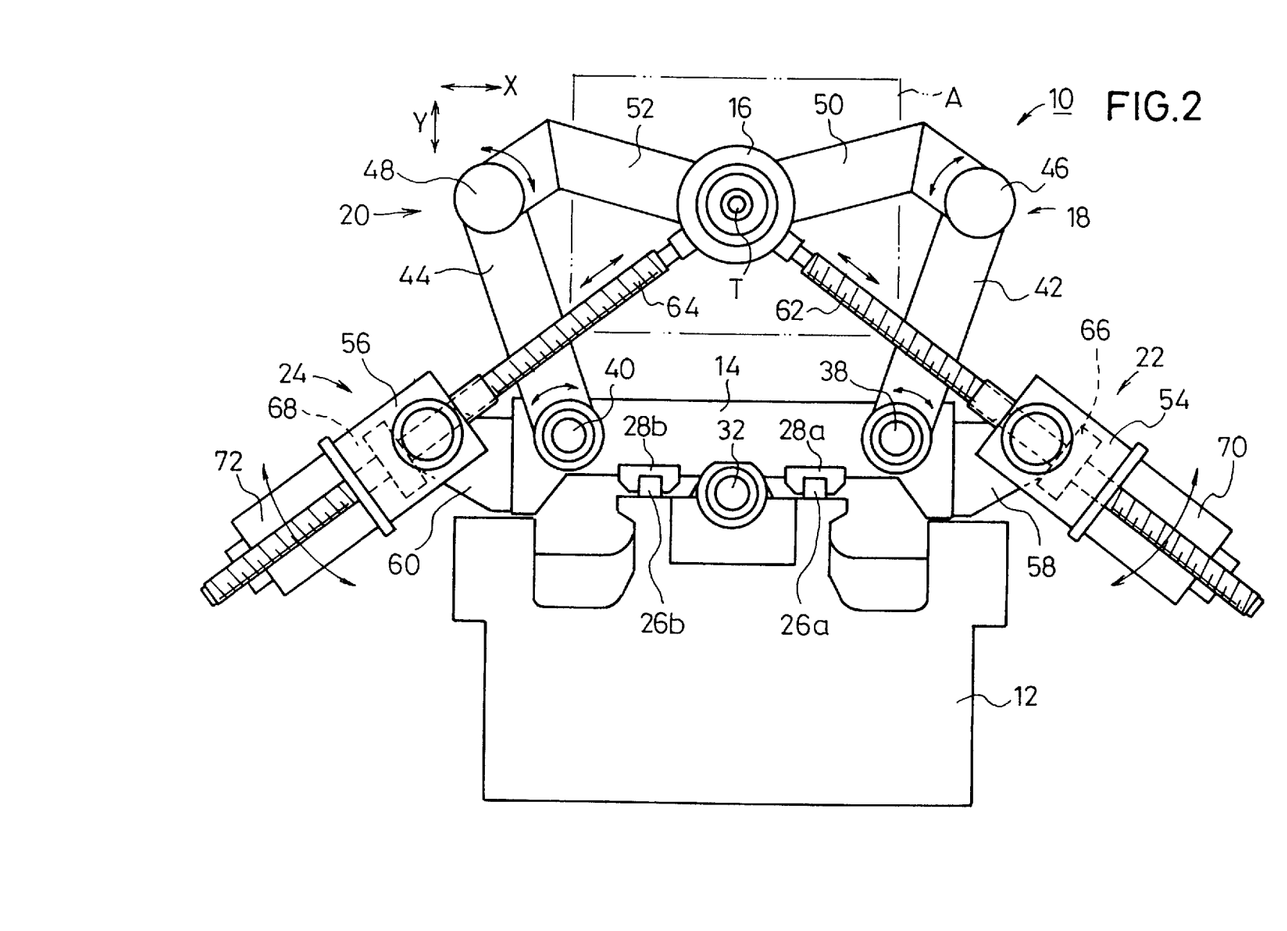
FIG. 2 is a front elevational view of the machine tool shown in FIG. 1.
Figure 5:
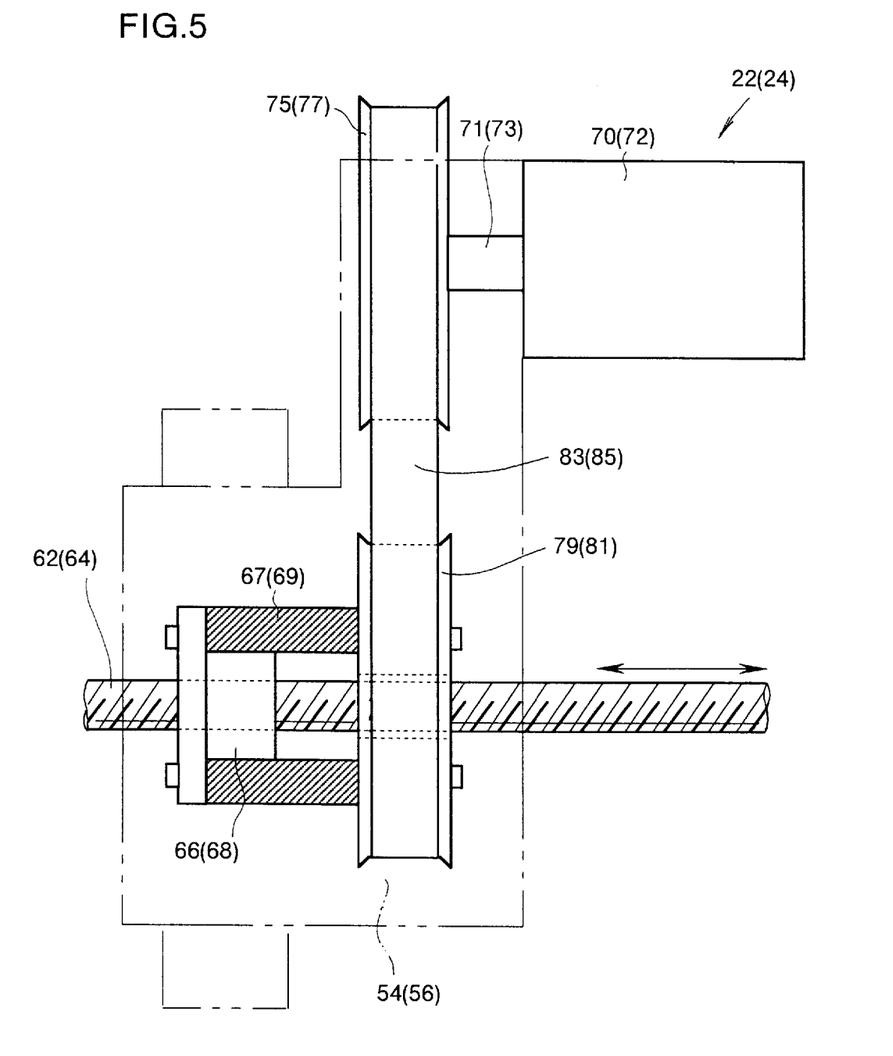
FIG. 5 is a cross-sectional view of a drive mechanism of displacing means of the machine tool shown in FIG. 1.

The displacing means 22, 24 have respective casings 54, 56 pivotally supported on respective brackets 58, 60 which are fixed to the slide table 14. As shown in FIG. 5, the casings 54, 56 support respective motors 70, 72 fixedly mounted thereon, and house therein respective pulleys 75, 77 mounted on respective rotatable shafts 71, 73 of the motors 70, 72, respective pulleys 79, 81 loosely fitted over the respective ball screws 62, 64, and respective nuts 66, 68 that are threaded respectively over ball screws 62, 64 and fixedly mounted respectively to the pulleys 79, 81 through rotating members 67, 69. The pulleys 75, 77 and the pulleys 79, 81 are operatively coupled to each other by respective timing belts 83, 85 trained therearound. The ball screws 62, 64 have respective ends fixed to respective rings 74, 76 which are mounted on the spindle unit 16. The rings 74, 76 are angularly movable about a Z-axis, which is aligned with the direction indicated by the arrow Z, independently of each other with respect to the spindle unit 16.

Figure 6:
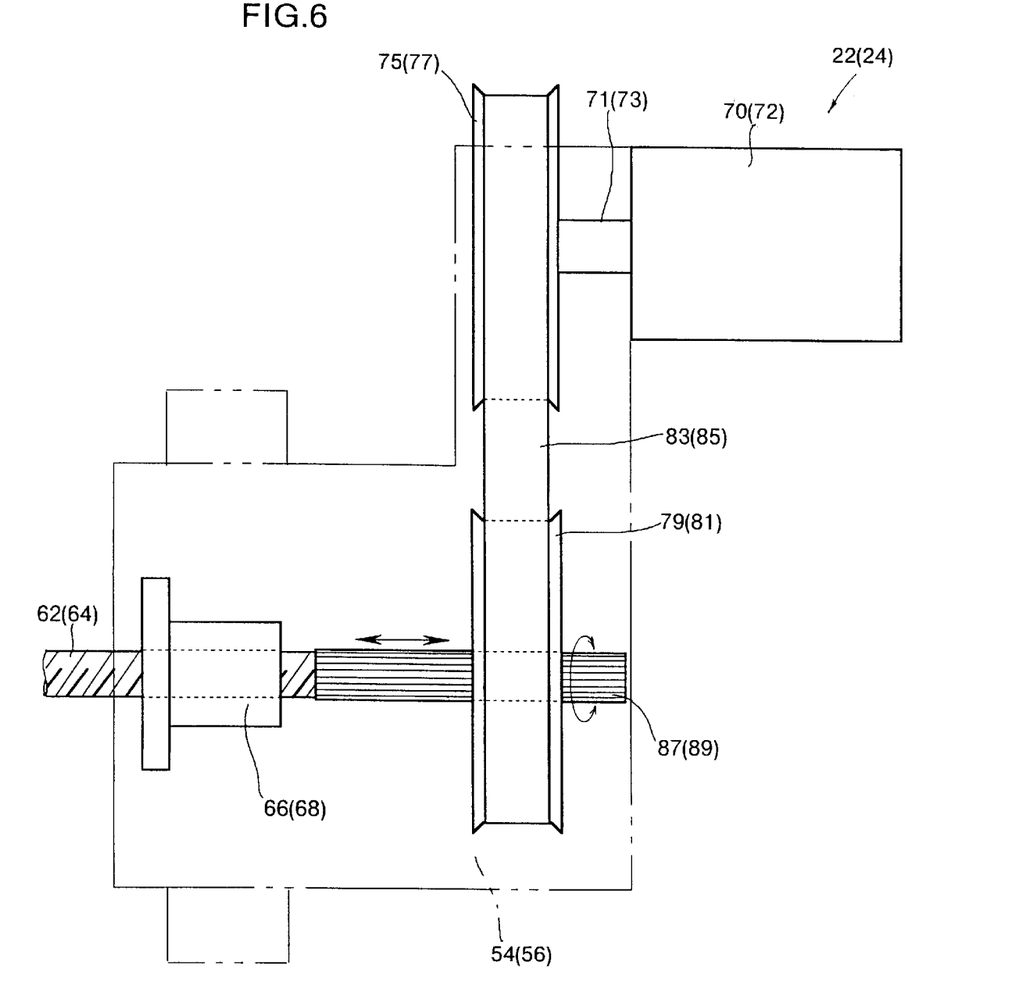
FIG. 6 is a cross-sectional view of a modified drive mechanism of displacing means of the machine tool shown in FIG. 1.
Figure 7:
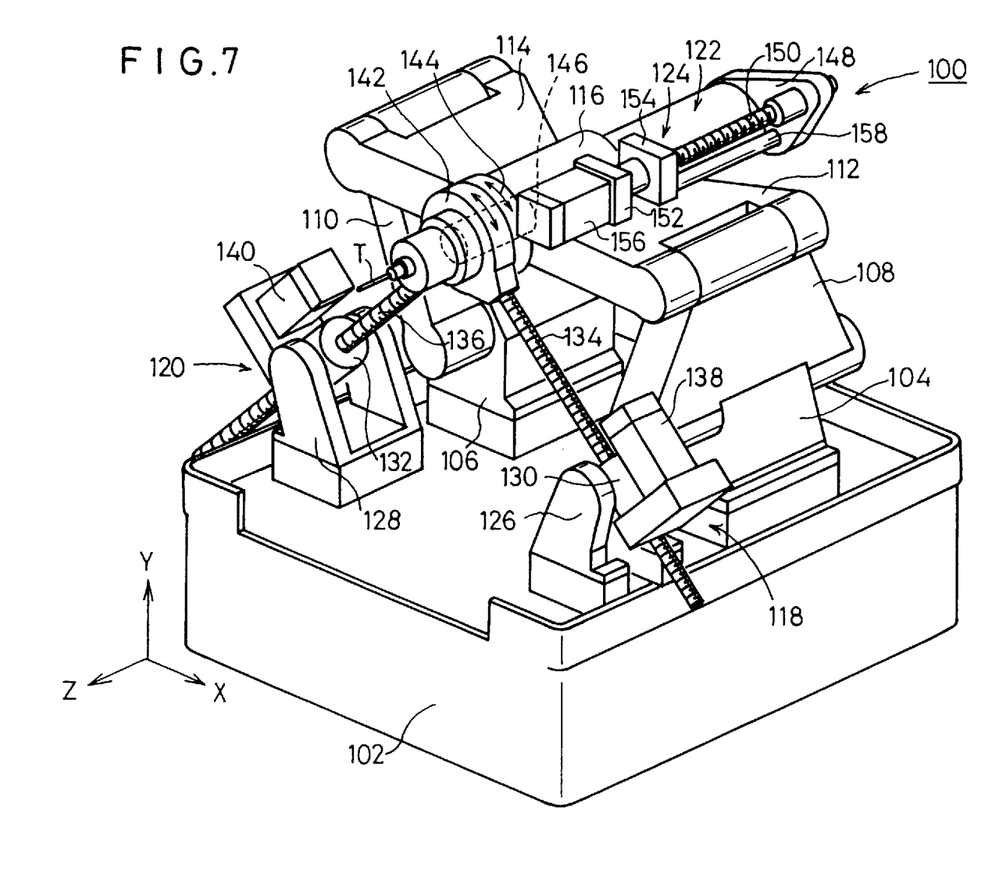
FIG. 7 is a perspective view of a machine tool according to a second embodiment of the present invention.

Instead of fixing the ball screws 62, 64 to the respective rings 74, 76, the ball screws 62, 64 may have respective ends rotatably supported on the respective rings 74, 76 and may be rotated and axially moved with respect to the respective nuts 66, 68 by the respective motors 70, 72. According to such a modification, as shown in FIG. 6, the ball screws 62, 64 have respective splined portions 87, 79, and the pulleys 79, 81 are mounted on the respective splined portions 87, 79 for rotation therewith. The nuts 66, 68 threaded over the respective ball screws 62, 64 are fixed to the casings 54, 56, respectively, independently of the pulleys 79, 81. Rotation of the motors 70, 72 is transmitted from the pulleys 75, 77 through the timing belts 83, 85 to the pulleys 79, 81, causing the splined portions 87, 89 to rotate the ball screws 62, 64 about their own axes. As a result, the ball screws 62, 64 are axially moved with respect to the respective nuts 66, 68 that are fixed to the casings 54. 56.

Figure 3:
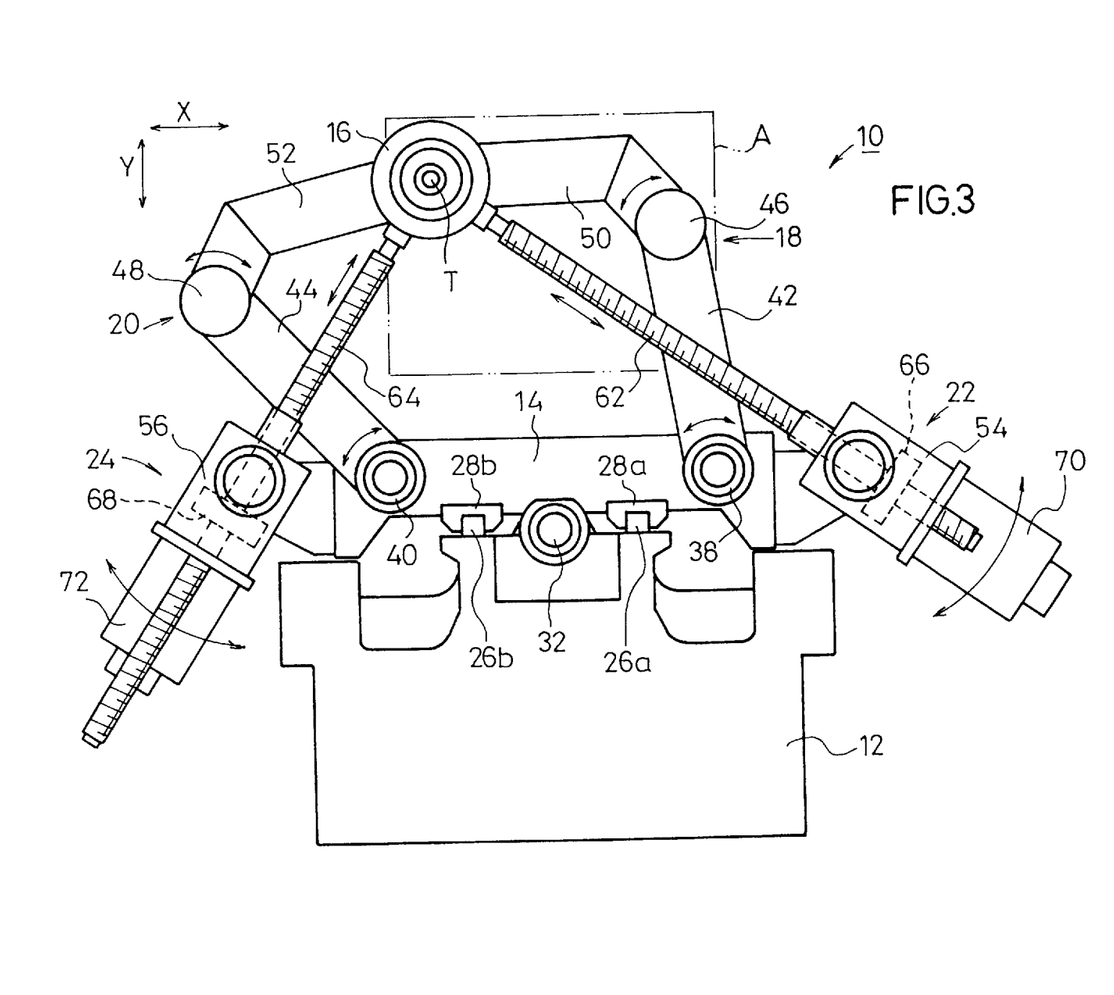
FIG. 3 is a front elevational view of the machine tool shown in FIG. 1, showing the parts in a different position.
Figure 4:
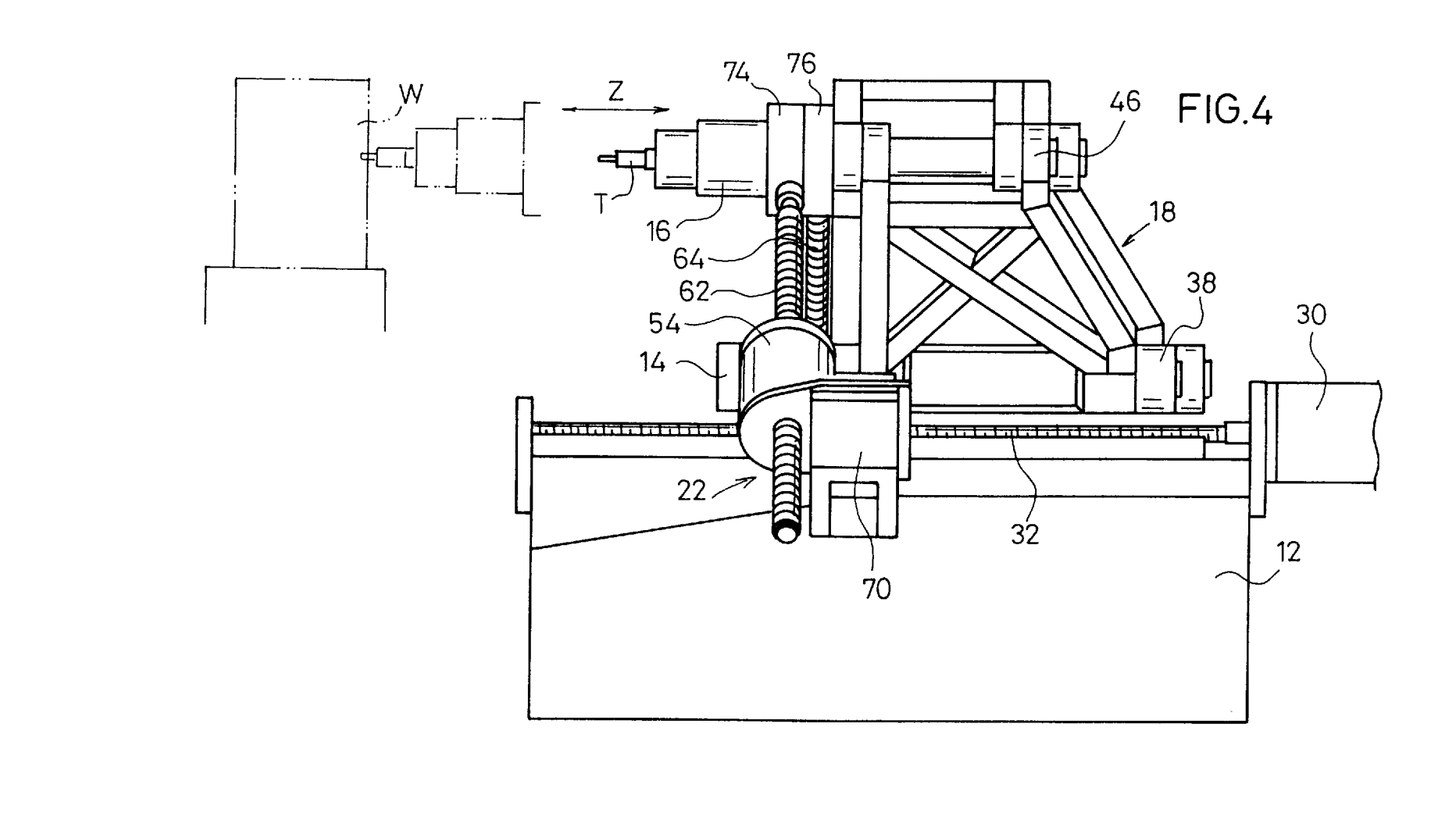
FIG. 4 is a side elevational view of the machine tool shown in FIG. 1.

The machine tool 10 thus constructed will operate as follows:

First, the cutter T is positioned in an X-Y plane, which lies along the directions indicated by the arrows X, Y, with respect to the workpiece W (see FIG. 4), as shown in FIG. 3. Specifically, rotation of the motors 70, 72 is transmitted from the pulleys 75, 77 through the timing belts 83, 85 to the pulleys 79, 81, which rotate to rotate the nuts 66, 68 fixed thereto. The ball screws 62, 64 threaded in the respective nuts 66, 68 are now axially moved (see FIG. 5). Since the ends of the ball screws 62, 64 are fixed to the respective rings 74, 76 and the casings 54, 56 are angularly movable about the respective brackets 58, 58, the spindle unit 16 supported on the ends of the ball screws 62, 64 is moved to a desired position in the directions indicated by the arrows X, Y within an area A indicated by the two-dot-and-dash lines in FIG. 2. As the spindle unit 16 is thus moved, the first arms 42, 44 and the second arms 50, 52 which support the spindle unit 16 are angularly moved with respect to the slide table 14 through the action of the bearings 48, 40 and 46, 48.

The spindle unit 16 thus positioned is supported by the support arm assemblies 18, 20 which have an articulated arm structure that is relatively light in weight. Therefore, the displacing means 22, 24 can position the cutter T easily and quickly through the support arm assemblies 18, 20.

Then, the cutter T is moved in the direction indicated by the arrow Z to machine the workpiece W. Specifically, the motor 30 fixed to the base 12 is energized to rotate the ball screw 32 about its own axis, causing the nut 34 threaded over the ball screw 32 to move the slide table 14 in the direction indicated by the arrow Z. At the same time, the cutter T mounted on the spindle unit 16 is rotated about its own axis by the motor 36, thus starting to machine the workpiece W.

Because the position of the cutter T with respect to the workpiece W in the X-Y plane is established by the displacing means 22, 24 and the spindle unit 16 is securely supported by the support arm assemblies 18, 20, the cutter T can machine the workpiece W stably with high precision. If the spindle unit 16 is relatively light in weight or the resistance, i.e., the cutting resistance or the like, imposed by the workpiece W as it is machined is small, then the spindle unit 16 may be supported by only one of the support arm assemblies 18, 20.

A machine tool according to a second embodiment of the present invention will be described below with reference to FIGS. 7 through 10.

As shown in FIGS. 7 through 10, the machine tool, generally denoted by 100, comprises a support base 102, a pair of laterally spaced brackets 104, 106 mounted on the support base 102, a pair of arm assemblies comprising a pair of respective first arms 108, 110 having respective lower ends pivotally supported on the respective brackets 104, 106 and a pair of respective second arms 112, 114 having respective ends pivotally supported on respective upper ends of the first arms 108, 110, a holder 116 mounted on the respective other ends of the second arms 112, 114, a pair of holder displacing means 118, 120 for displacing the holder 116 in the directions indicated by the arrows X, Y, a spindle unit 122 slidably supported by the holder 116 and having a cutter T movable in the direction indicated by the arrow Z toward a workpiece W (see FIG. 8) to be machined by the machine tool 100, and a spindle unit displacing means 124 for displacing the spindle unit 122 in the direction indicated by the arrow Z.

The holder displacing means 118, 120 comprise a pair of respective casings 130, 132 pivotally supported on respective brackets 126, 128 mounted on the base 102, a pair of respective ball screws 134, 136 extending through the respective casings 130, 132, and a pair of motors 138, 140 for rotating the respective ball screws 134, 136 about their own axes. Each of the casings 130, 132 houses therein the drive mechanism shown in FIG. 5 or 6. The ball screws 134, 136 have respective ends fixed to respective rings 142, 144 which are mounted on the holder 116. The rings 142, 144 are angularly movable about a Z-axis, which is aligned with the direction indicated by the arrow Z, independently of each other with respect to the holder 116.

The spindle unit 122 has a built-in motor 146 for rotating the cutter T about its own axis.

The spindle unit displacing means 124 comprises a ball screw 150 threaded through a nut 148 mounted on an end of the spindle unit 122, and a motor 156 mounted on the holder 116 by brackets 152, 154 and having a rotatable shaft coaxially coupled to the ball screw 150 for rotating the ball screw 150 about its own axis. A guide bar 158 extends between and is connected to the nut 148 and the holder 116. The nut 148 is movable with the spindle unit 122 along the guide bar 158 in the direction indicated by the arrow Z.

Operation of the machine tool 100 will be described below.

Figure 8:
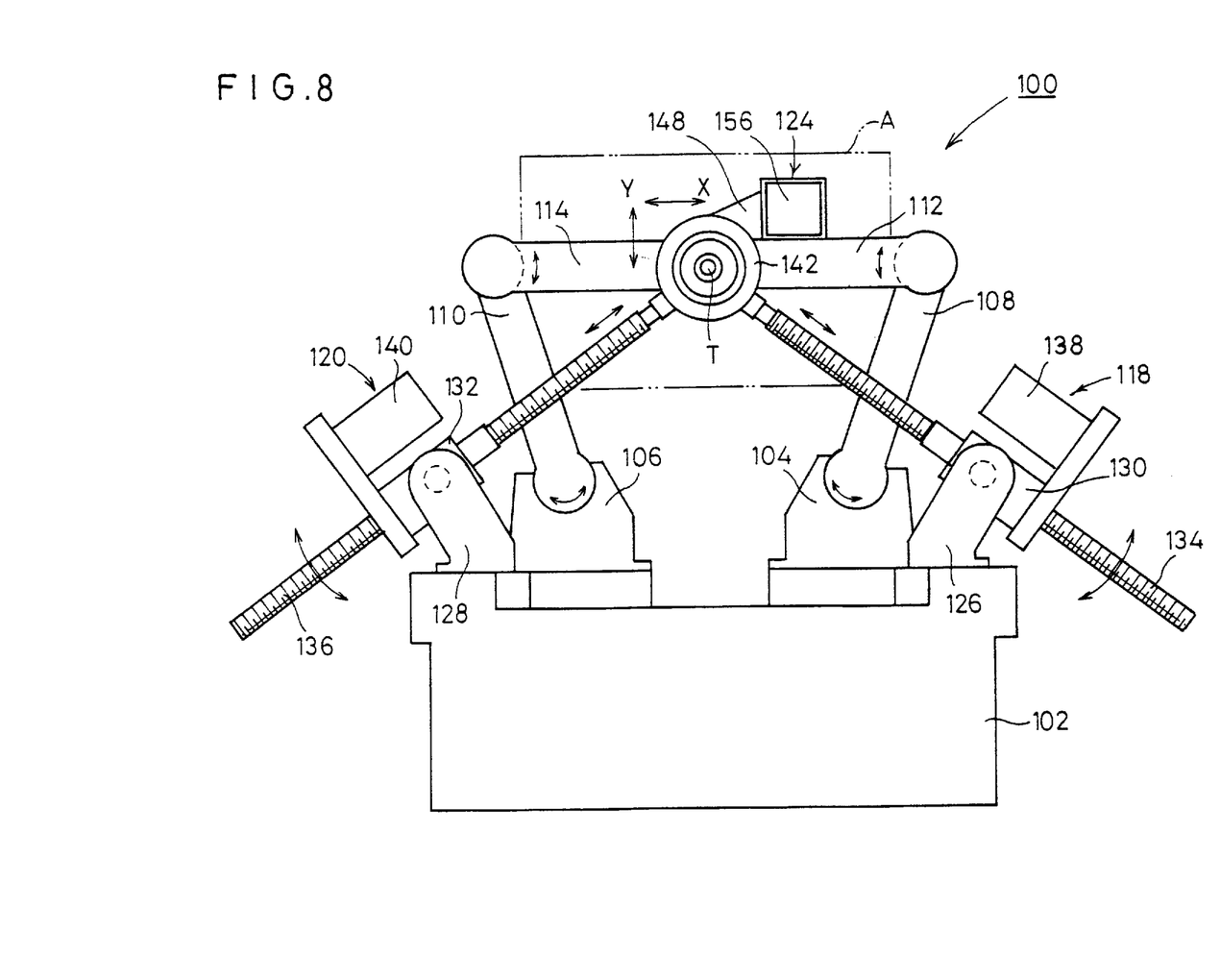
FIG. 8 is a front elevational view of the machine tool shown in FIG. 7.
Figure 9:
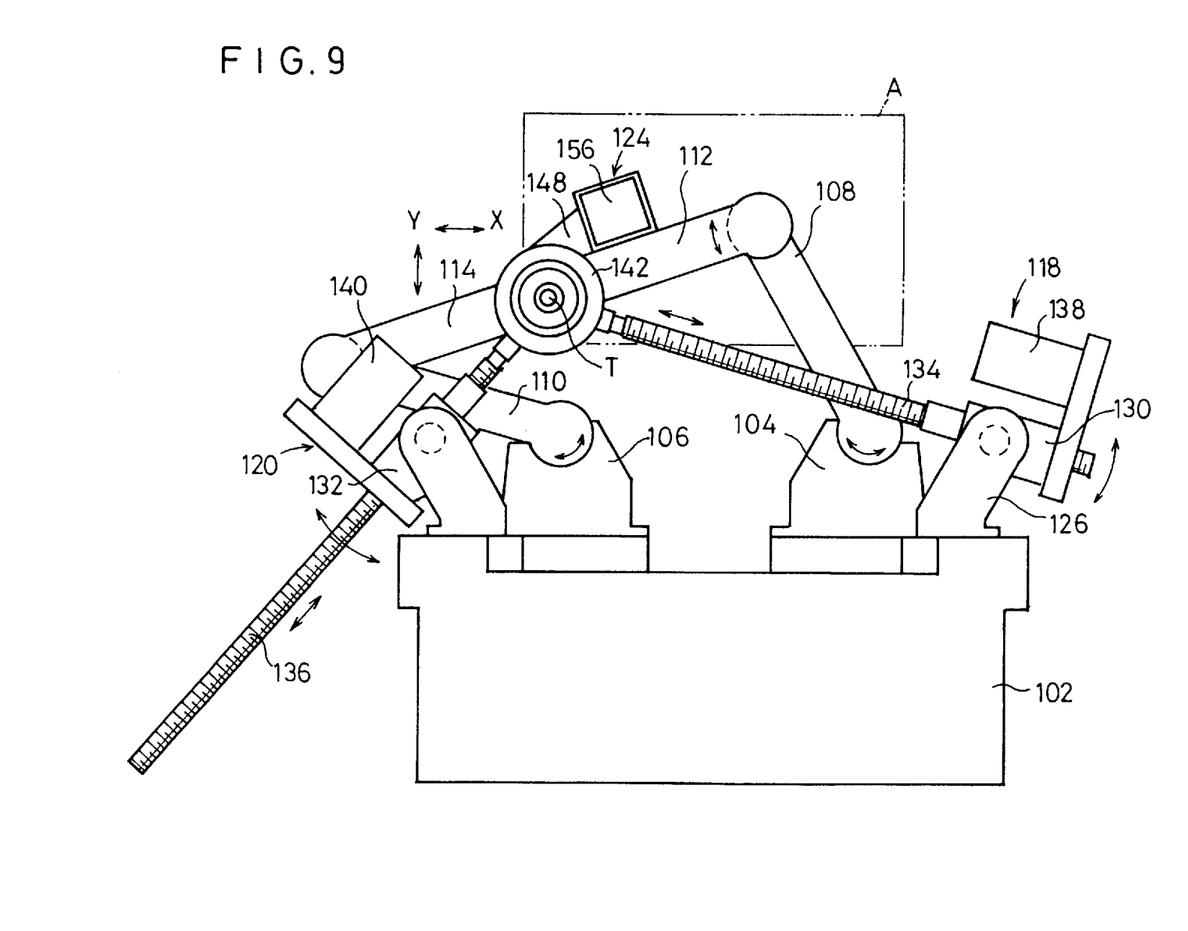
FIG. 9 is a front elevational view of the machine tool shown in FIG. 7, showing the parts in a different position.
Figure 10:
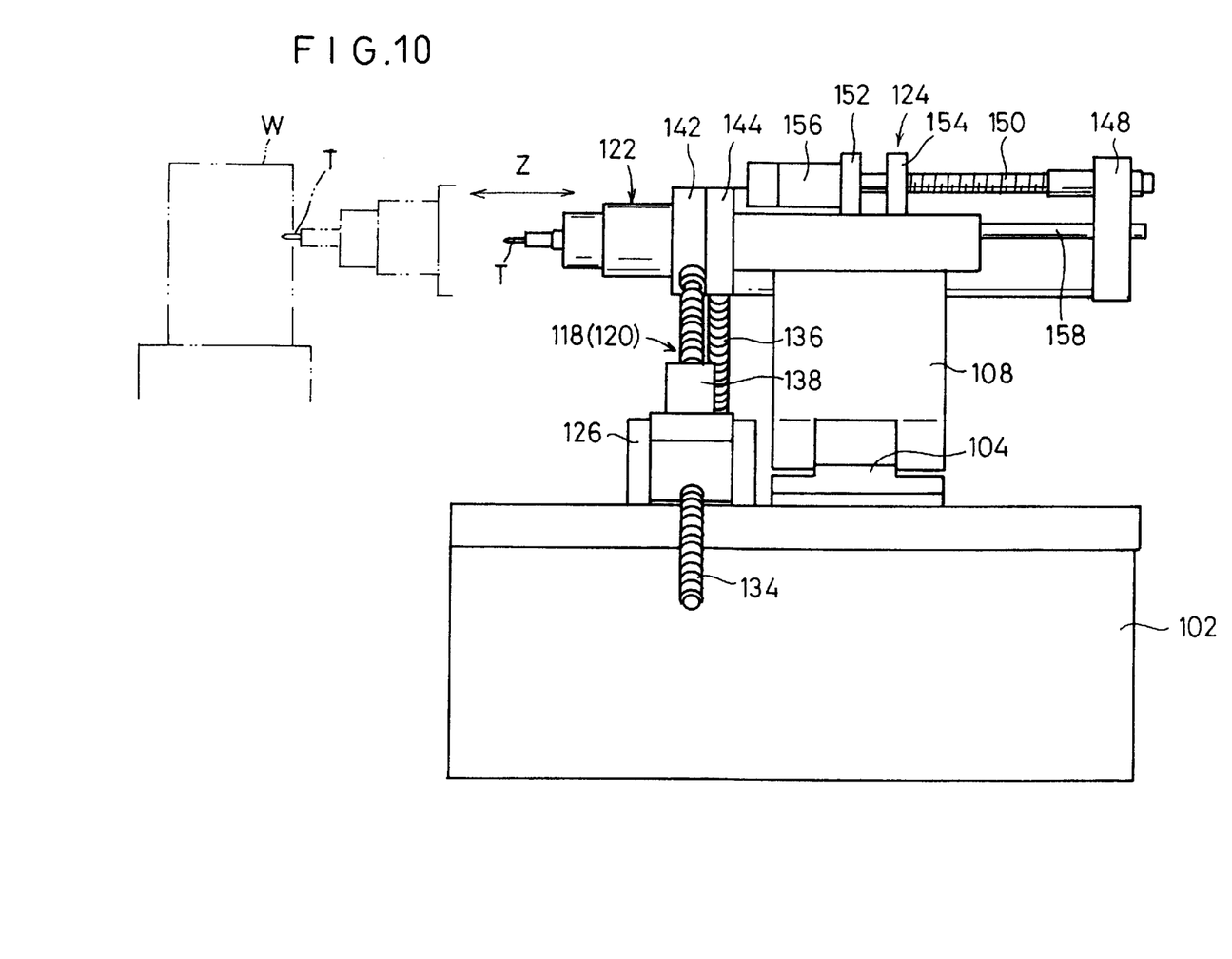
FIG. 10 is a side elevational view of the machine tool shown in FIG. 7.

First, the cutter T is positioned in an X-Y plane, which lies along the directions indicated by the arrows X, Y, with respect to the workpiece W (see FIG. 8). Specifically, the motors 138, 140 are energized to move the ball screws 134, 136 axially by given distances, respectively, as with the first embodiment. Therefore, the spindle unit 122 is moved by the holder 116 supported on the ends of the ball screws 134, 136, to a desired position in the directions indicated by the arrows X, Y within an area A indicated by the two-dot-and-dash lines in FIG. 8. As the holder 116 is thus moved, the first arms 108, 110 and the second arms 112, 114 which support the holder 116 are angularly moved with respect to the base 102.

Then, the cutter T is moved in the direction indicated by the arrow Z to machine the workpiece W. Specifically, the motor 156 mounted on the holder 116 is energized to rotate the ball screw 150 about its own axis, causing the nut 148 threaded over the ball screw 150 to move the spindle unit 122 in the direction indicated by the arrow Z, slidably with respect to the holder 116. At the same time, the cutter T mounted on the spindle unit 122 is rotated about its own axis by the motor 146, thus starting to machine the workpiece W.

The spindle 122 set to the desired position in the X-Y plane is supported by the first arms 108, 110 and the second arms 112, 114 which are relatively light in weight. Therefore, the holder displacing means 118, 120 can position the cutter T easily and quickly with respect to the workpiece W. Because the position of the cutter T with respect to the workpiece W in the X-Y plane is established by the ball screws 134, 136, the first arms 108, 110, and the second arms 112, 114, the cutter T can machine the workpiece W stably with high precision. Since the spindle unit 122 is movable by the spindle unit displacing means 124, which is relatively light in weight, mounted on the holder 116, the spindle unit 122 can displace the cutter T easily and quickly with respect to the workpiece W without imposing an undue load on the motor 156 of the spindle unit displacing means 124. If the spindle unit 122 is relatively light in weight or the resistance, i.e., the cutting resistance or the like, imposed by the workpiece W as it is machined is small, then the spindle unit 122 may be supported by one of the first arms 108, 110 and the corresponding one of the second arms 112, 114.

Although certain preferred embodiments of the present invention has been shown and described in detail, it should be understood that various changes and modifications may be made therein without departing from the scope of the appended claims.

What is claimed is:

1. A machine tool comprising:

a slide table movable in directions toward and away from a workpiece;

a spindle unit;

support arm means for moving said spindle unit in a plane transverse to said directions and comprising a pair of support arm assemblies supporting said spindle unit, wherein said pair of support arm assemblies comprise a pair of respective first arms having first ends pivotally supported on said slide table, and a pair of respective second arms having first ends pivotally supported on second ends of said first arms, said spindle unit being supported on second ends of said second arms, said spindle unit having a cutter for machining said workpiece and a pair of rings rotatable about a common axis independently of each other; and displacing means coupled to said rings and interconnecting said slide table and said spindle unit, for displacing said spindle unit to a predetermined position within said plane;

wherein said second ends of said respective second arms and said rings are pivotal about said common axis.

2. A machine tool according to claim 1, wherein said displacing means comprises a pair of ball screws interconnecting said slide table and said spindle unit, a pair of nuts threaded over said ball screws, respectively, and a pair of motors for rotating either said ball screws or said nuts about their own axes.

3. A machine tool comprising:

a support base;

a holder;

support arm means for moving said holder in a plane and comprising a pair of support arm assemblies, wherein said support arm assemblies comprise a pair of respective first arms having first ends pivotally supported on said support base, and a pair of respective second arms having first ends pivotally supported on second ends of said first arms, said holder mounted on second ends of said second arms and comprising a pair of rings rotatable about a common axis independently of each other;

holder displacing means coupled to said rings and interconnecting said support base and said holder, for displacing said holder to a predetermined position within said plane;

a spindle unit supported by said holder for movement in a direction transverse to said plane and having a cutter for machining a workpiece; and spindle unit displacing means mounted on said holder, for displacing said spindle unit in said direction;

wherein said second ends of said respective second arms and said rings are pivotal about said common axis.

4. A machine tool according to claim 3, wherein said holder displacing means comprises a pair of ball screws interconnecting said support base and said holder, a pair of nuts threaded over said ball screws, respectively, and a pair of motors for rotating either said ball screws or said nuts about their own axes.

5. A machine tool according to claim 3, wherein said spindle unit displacing means comprises a ball screw interconnecting said holder and said spindle unit, and a motor for rotating said ball screw about its own axis.

* * * * *